United States Patent
Yeon et al.

(10) Patent No.: US 10,962,462 B2
(45) Date of Patent: Mar. 30, 2021

(54) PARTICULATE MATTER-SENSING SENSOR ASSEMBLY

(71) Applicants: Hyundai Motor Company, Seoul (KR); Kia Motors Corporation, Seoul (KR); Hanon Systems, Daejeon (KR)

(72) Inventors: Dong-Won Yeon, Daejeon (KR); Myung-Jun Kim, Busan (KR); Sang-Ho Oh, Daejeon (KR); Chae-Geun Lim, Daejeon (KR); Jun-Ho Choi, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 0 days.

(21) Appl. No.: 16/390,762

(22) Filed: Apr. 22, 2019

(65) Prior Publication Data

US 2020/0096430 A1    Mar. 26, 2020

(30) Foreign Application Priority Data

Sep. 20, 2018   (KR) .................. 10-2018-0113135

(51) Int. Cl.
    *G01N 15/06*  (2006.01)
    *G01N 21/15*  (2006.01)

(52) U.S. Cl.
    CPC ............. *G01N 15/06* (2013.01); *G01N 21/15* (2013.01); *G01N 2015/0693* (2013.01)

(58) Field of Classification Search
    CPC ........... G01N 21/15; G01N 2015/0046; G01N 2015/0096; G01N 2015/1486; G01N 15/06; G01N 2015/0693; G01N 15/0211; G01N 15/1459; G01N 2021/151; G01N 21/53

See application file for complete search history.

(56) References Cited

U.S. PATENT DOCUMENTS 6,184,537 B1 * 2/2001  Knox .................. G08B 17/113
                                                     250/574
2019/0339191 A1 * 11/2019  Kim ......................... G01B 9/00

FOREIGN PATENT DOCUMENTS

KR    10-2010-0114300 A    10/2010

* cited by examiner

*Primary Examiner* — Hina F Ayub
(74) *Attorney, Agent, or Firm* — Morgan, Lewis & Bockius LLP

(57) ABSTRACT

A particulate matter-sensing sensor assembly may include a housing in which an air flow passage through which air flowed thereinto from the outside thereof flows is formed, a fan motor internally disposed within the housing for flowing air into the air flow passage from the outside, a light source emitting light to allow light to intersect with air flowing into the air flow passage, and a light receiving sensor configured to receive light scattered by dust contained in air passing through the air flow passage, wherein the air flow passage is configured such that a region where air flows thereinto from the outside thereof has a cross-sectional area greater than that of a region where light emitted from the light source intersects with flowing air.

19 Claims, 10 Drawing Sheets

PARTICULATE MATTER-SENSING SENSOR ASSEMBLY

CROSS-REFERENCE TO RELATED APPLICATIONS

The present application claims priority to Korean Patent Application No. 10-2018-0113135, filed on Sep. 20, 2018, the entire contents of which is incorporated herein for all purposes by this reference.

BACKGROUND OF THE DISCLOSURE

Field of the Disclosure

The present invention relates to a particulate matter-sensing sensor for detecting concentration of particulate matter contained in air, and more particularly, to a particulate matter-sensing sensor assembly which prevents dust from being adsorbed onto a light source or a light receiving element, preventing output value from being lowered due to adsorption of dust, and which does not need to periodically remove adsorbed dust.

Description of Related Art

Since particulate matter distributed in the air can cause various respiratory diseases, particulate matter contained in air may be managed at an appropriate level or lower.

In particular, recently, maleficence of ultrafine particulate matter (PM 2.5) having a diameter of 2.5 µm or less has been widely known, and interest in particulate matter in the air has been further heightened.

In an enclosed space like the internal of a vehicle, by detecting concentration of particulate matter in indoor air, and by cleaning air with an air cleaner, it is possible to manage concentration of particulate matter.

FIG. 1 illustrates a particulate matter-sensing sensor assembly 100 according to the related art. A passage, in which air flowing into the passage from the outside thereof through an inlet 111a flows, is formed in a housing 111 and a fan motor 115 is provided for allowing air to flow into the housing 111, so that when the fan motor 115 is operated, air containing dust flows into the housing from the outside. Furthermore, a light source 121 and a light receiving sensor 125 receiving light emitted from the light source 121 are provided in the housing 111. Infrared rays emitted from the light source 121 are scattered by dust contained in air while passing through air flowing into the passage. Infrared ray scattered by dust passes through a band-pass filter 123 that does not pass ultraviolet rays and visible rays, and are then collected by a condenser lens 124. As such, e infrared rays received by the light receiving sensor 125 is determined to measure concentration of particulate matter in air.

However, the conventional particulate matter-sensing sensor assembly 100 according to the related art has a problem in that when the assembly is used for long time, dust is adsorbed onto components which are in contact with flowing air, for example, a clear plate 122 configured to protect the light source 121, the band-pass filter 123, and the like.

The amount of light received by the light receiving sensor 125 is reduced due to adsorption of particulate matter, and thus there is a problem that detecting performance of the particulate matter-sensing sensor assembly 100 deteriorates.

Furthermore, to solve the problem caused by adsorption of particulate matter, there is an inconvenience that the particulate matter-sensing sensor assembly 100 may be periodically disassembled to remove particulate matter.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a particulate matter-sensing sensor assembly configured to prevent particulate matter contained in air flowing therein from being adsorbed and to maintain sensitivity even after prolonged use.

To achieve the above described object, a particulate matter-sensing sensor assembly according to an exemplary embodiment of the present invention may include a housing in which an air flow passage through which air flowed thereinto from the outside thereof flows is formed, a fan motor internally disposed within the housing for flowing air into the air flow passage from the outside, a light source emitting light to allow light to intersect with air flowing into the air flow passage, and a light receiving sensor configured to receive light scattered by dust contained in air passing through the air flow passage, wherein the air flow passage may be configured such that a region where air flows thereinto from the outside thereof has a cross-sectional area greater than that of a region where light emitted from the light source intersects with flowing air.

The air flow passage may include an inlet portion into which air flows from the outside, the inlet portion having a predetermined cross-sectional area over a predetermined length; and a detecting portion connected to the inlet portion, having a cross-sectional area smaller than that of the inlet portion, and intersecting with light emitted from the light source.

The housing may have a light path portion formed therein and being in communication with the air flow passage to radiate light, which is emitted from the light source, to the air flow passage.

In a neck portion connecting the inlet portion and the detecting portion, a direction of air flow in the air flow passaged may be changed from a width direction of the housing to a height direction of the housing.

The neck portion may be formed such that an internal wall gradually approaches an external wall facing the housing to decrease a cross-sectional area.

The detecting portion may be formed to have a cross-sectional area which is decreased and then increased, in a flow direction of air.

The air flow passage may have a minimum cross-sectional area at a region where the air flow passage is in communication with the light path portion.

A dust collecting portion may be formed on the light path portion, and the dust collecting portion is a space formed in a direction perpendicular to the light path portion.

The plurality of dust collecting portions may be formed at certain intervals along the light path portion.

The dust collecting portions are formed to have different cross-sectional areas, respectively.

The dust collecting portions may be formed such that the cross-sectional area becomes smaller as a distance between the light source and the dust collecting portion is increased.

A light extinction portion may be formed coaxially with the light path portion to allow light passing through the air flow passage and being incident thereonto to become extinct therein.

The light extinction portion may include a reflecting surface configured to reflect light passed through the air flow passage into the light extinction portion; and a plurality of inclined surfaces which are repeatedly formed so that light reflected on the reflecting surface becomes extinct.

The light receiving sensor may be disposed in a direction perpendicular to the light path portion.

The light source may emit a laser beam radiating to air flowing into the air flow passage.

The light receiving sensor may be a photodiode receiving light scattered by dust flowing into the air flow passage, and a controller is configured to determine concentration of dust by processing a signal outputted from the light receiving sensor.

The housing may be provided with a cover configured to enclose the internal of the housing, and the cover may have an inlet formed therein and being in communication with the air flow passage to allow air to flow into the air flow passage from the outside.

The cover may be provided with an air inlet port formed thereon for flow air from an air vent, which blows air to the internal of the vehicle, into the housing, and a contact pad configured to seal the housing.

The housing may have a mounting hole formed in one side thereof, and a fastener may pass through the mounting hole to fasten the housing to the air vent.

The fastener may be a fastening bolt, and the air vent may have a mounting portion formed thereon to be protruded, and the fastening bolt is screw-coupled to the mounting portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
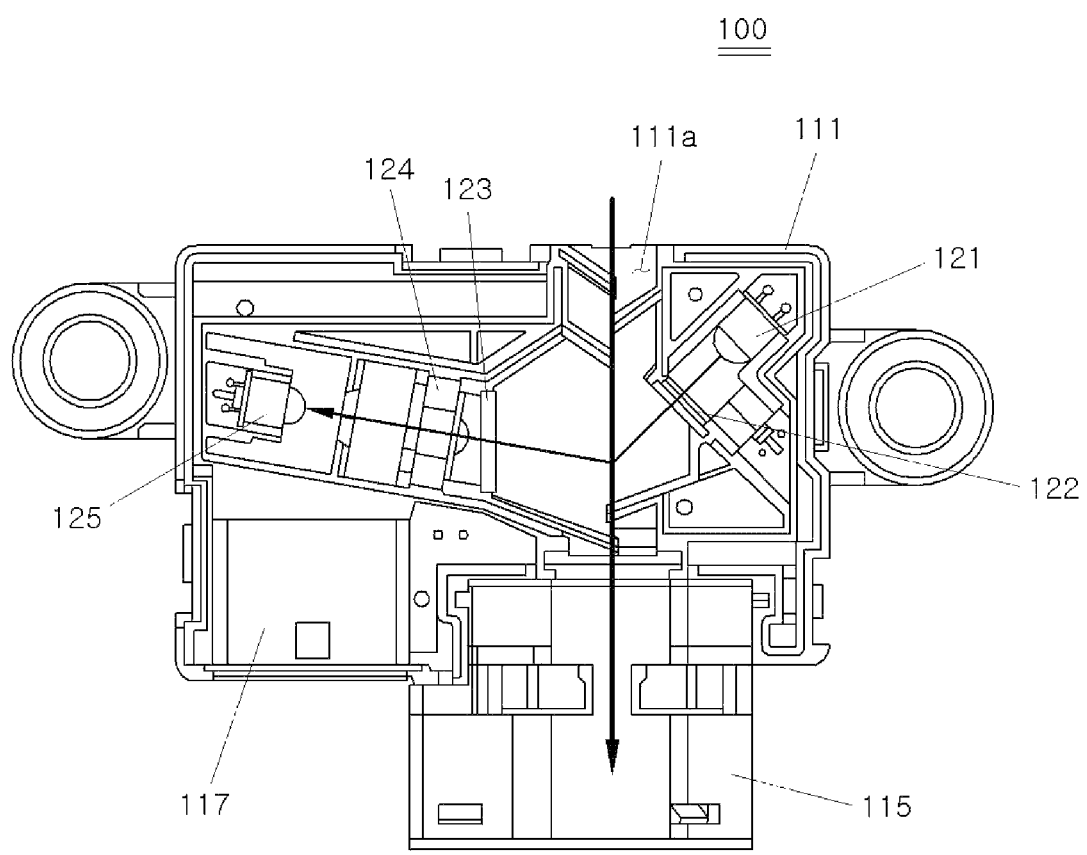
FIG. 1 is a cross-sectional view exemplarily illustrating an internal of a particulate matter-sensing sensor assembly according to the related art.
Figure 2:
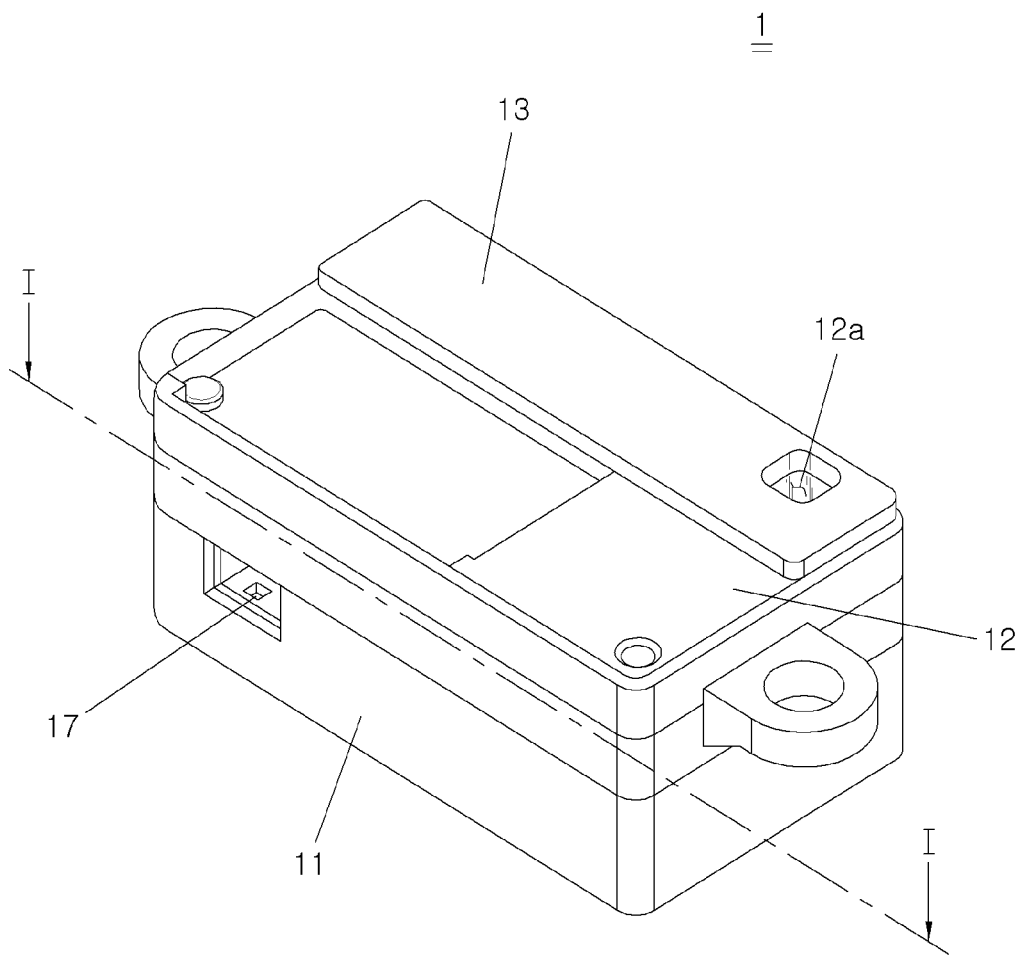
FIG. 2 is a perspective view exemplarily illustrating a particulate matter-sensing sensor assembly according to an exemplary embodiment of the present invention.
Figure 3:
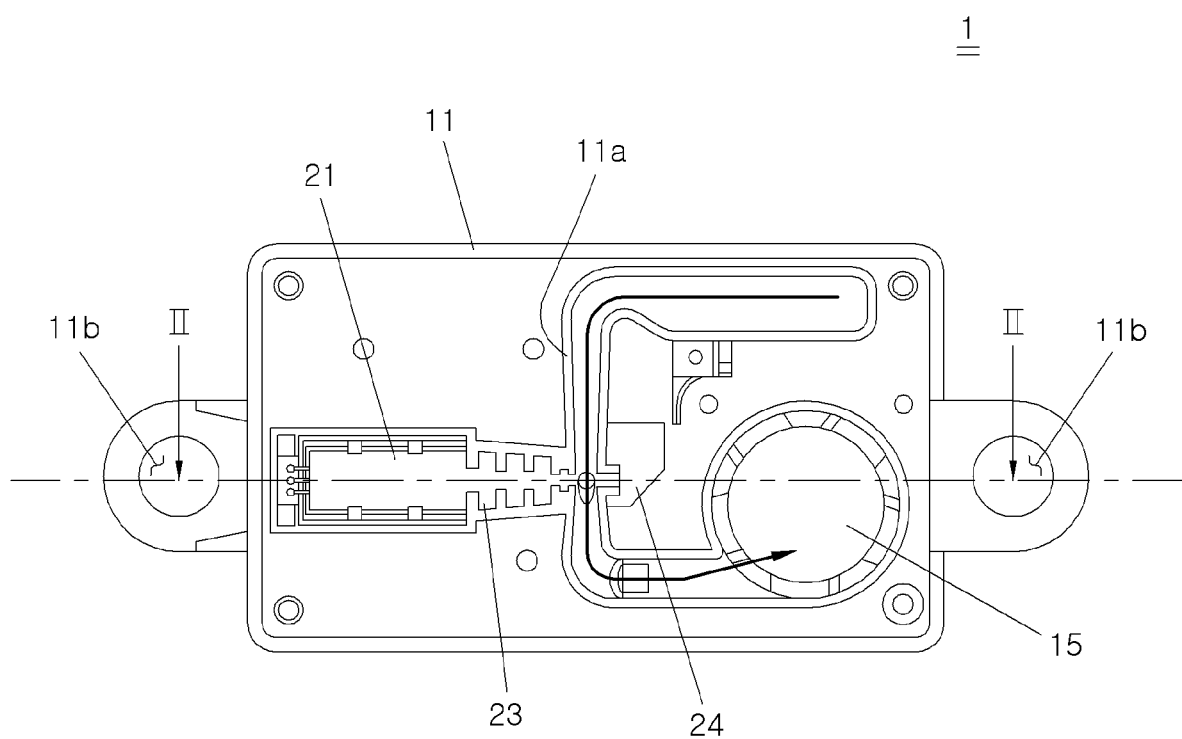
FIG. 3 is a cross-sectional view taken along line I-I in FIG. 2 and illustrating the internal of the particulate matter-sensing sensor assembly according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a particulate matter-sensing sensor assembly according to an exemplary embodiment of the present invention is described in detail with reference to the accompanying drawings.

A particulate matter-sensing sensor assembly 1 according to an exemplary embodiment of the present invention includes a housing 11 in which an air flow passage 11a through which air flowed thereinto from the outside thereof flows is formed, a fan motor 15 internally disposed within the housing 11 for flowing air into the air flow passage 11a from the outside, a light source 21 emitting light to allow light to intersect with air flowing into the air flow passage 11a, and a light receiving sensor 25 configured to receive light scattered by dust contained in air passing through the air flow passage 11a.

The air flow passage 11a in which air flows is formed within the housing 11, and other structural components which will be described later are mounted in the housing.

The air passage 11a is formed within the housing 11 to enable air, which flowed thereinto from the outside, to flow therein. The air flow passage 11a includes an inlet portion 11aa into which air flows from the outside, a detecting portion 11ab configured to detect dust contained in air flowing into the air flow passage 11a, and a neck portion 11ac connecting the inlet portion 11aa and the detecting portion 11ab.

The inlet portion 11aa forms a vortex of air, which flowed thereinto from the outside, within the inlet portion 11aa to prevent dust having a relatively large particle size from flowing into the detecting portion 11ab. The inlet portion 11aa is formed to have a predetermined cross-sectional area over a predetermined length in one direction of the housing 11. The inlet portion 11aa is then reduced in cross-sectional area, and is connected to the detecting portion 11ab through the neck portion 11ac which changes an air flow direction to a direction perpendicular to the inlet portion 11aa. A flow direction of air flowing into the inlet portion 11aa in a height direction of the housing 11 is changed to a width direction of the housing 11 in the inlet portion 11aa.

A sectional area of the neck 11ac connected to the inlet portion 11aa is smaller than that of the inlet portion 11aa, and the neck portion 11ac allows a direction of the air flow passage 11a to be changed from the width direction to the height direction of the housing 11. Therefore, a vortex is generated in the flow of the air, which flows into the inlet portion from the outside, in the inlet portion 11aa, so that dust having relatively large diameter (about 10 μm or more) is remained within the inflow portion 11aa, while dust having small diameter is moved to the detecting portion 11ab via the neck portion 11ac.

Since dust having a large particle size is primarily blocked in the inlet portion 11aa as described above, the light source 21 or the light receiving sensor 25 is prevented from being contaminated by dust having a large particle size, and thus durability of the particulate matter-sensing sensor assembly 1 may be enhanced.

Furthermore, by removing dust having a large particle size in the inlet portion 11aa and allowing dust having a small particle size to flow into the detecting portion 11ab, a particle size of dust which may be measured in the detecting portion 11ab can be controlled. For example, by blocking dust of PM 10 or more in the inlet 11aa, concentration of ultrafine particulate matter of, for example, PM 2.5 may be measured in the detecting portion 11ab.

The detecting portion 11ab is connected to the inlet portion 11aa through the neck portion 11ac. The detecting portion 11ab is formed to allow air to linearly flow to detect dust contained in air flowing into the air flow passage 11a. At the instant time, to prevent dust from being adsorbed on the light source 21 described later, the flow rate of air is maximized at a region where light is emitted from the light source 21 is projected. When the flow rate of air is increased, dust is difficult to be separated from flowing air. Accordingly, by increasing the flow rate of air in the air flow passage 11a, dust is prevented from being moved toward the light source 21. Meanwhile, to increase the flow rate of air flowing through the air flow passage 11a, the air flow passage 11a is formed to have the cross-sectional area which is decreased and then increased, in a flow direction of air. When a cross-sectional area of an intermediate portion of the detecting portion 11ab is smaller that of each of an inlet and an outlet, the flow rate of air in the intermediate portion is increased, and thus it is possible to preventing dust from being moved toward the light source 21. That is, the detecting portion 11ab is formed so that the cross-sectional area of the detecting portion is decreased from the inlet portion 11aa in the direction in which air flows, becomes minimum at a region where the air flow intersects with light emitted from the light source 21, and is then increased again. When air flows into the detecting portion 11ab, the flow rate of air reaches a maximum value at a region where the cross-sectional area is the smallest, and thus it is possible to prevent dust from being moved from the air flow passage 11a to the light source 21.

In the neck portion 11ac, the cross-sectional area of the inlet portion 11aa is changed to be decreased and a direction of the air flow passage 11a is changed. The neck portion 11ac allows the direction of the air flow passage 11a to be changed from the height direction to the width direction of the housing 11. Furthermore, the neck portion 11ac is connected to the detecting portion 11ab in a state where a cross-sectional area thereof is gradually decreased. The neck portion 11ac is formed such that to gradually decrease the cross-sectional area, an internal wall thereof gradually approaches an external wall thereof facing the housing 11. In the neck portion 11ac of the air passage flow passage 11a, in other words, a direction of the external wall facing the housing is merely changed from the width direction of the housing 11 to the height direction thereof, but the internal wall gradually approaches the external wall, and simultaneously a direction of the internal wall is changed from the width direction to the height direction of the housing 11.

A cover 12 is connected to the housing 11 to close the internal of the housing 11. An inlet 12a is formed on one side of the cover 12 and passes through the cover 12 to allow air to flow into the air flow passage 11a from the outside.

A contact pad 13 is mounted on the cover 12 to seal a region through which air flows into the housing when the particulate matter-sensing sensor assembly of the present invention is mounted.

The fan motor 15 is disposed at an outlet side of the air flow passage 11a in the housing 11 to allow air to flow into the air flow passage 11a from the outside.

A connector 17 configured to supply power required for operating the light source 21 and the fan motor 15 and to output measured value outputted from the light receiving sensor 25 or determined concentration value of particulate matter is mounted on one side of the housing 11.

The light source 21 is mounted in the housing 11 to emit light used for detecting particulate matter. In an exemplary embodiment of the present invention, a laser module configured to emit a laser beam is employed as the light source 21, when the laser beam is scattered in particulate matter in the air flow passage 11a, the light receiving sensor measures scattered light to detect particulate matter contained in air.

A light path portion 22 is a path along which light emitted from the light source radiates. The light path portion 22 is formed in the housing 11 and extends perpendicularly to the air flow passage 11a, and one end portion of the light path portion 22 is in communication with the air flow passage 11a. At the instant time, the light path portion is formed such that a diameter of the region where the light path portion 22 is in communication with the air flow passage 11a does not allow air to flow to the light source 21, while allowing light emitted from the light source to pass. For example, by forming the diameter of the region where the light path portion 22 is in communication with the air flow passage 11a to be about 1 mm, although light emitted from the light source 21 passes through the present region and radiates toward the air flow passage 11a, air does not flow in the light path portion 22 from the air flow passage 11a toward the light source 21, and thus it is possible to prevent dust contained in flowing air from flowing into the light source.

A dust collecting portion 23 is formed on the light path portion 22 in a direction perpendicular to the light path portion 22. The dust collecting portion 23 is a space formed in a direction perpendicular to an axis of the light path portion 22, and even when particulate matters enter the light path portion 22, particulate matters are collected and accumulated in the dust collecting unit 23 to prevent particulate matters from being moved to the light source 21.

The plurality of dust collecting portions 23 are formed at certain intervals in a longitudinal direction of the light path portion 22. Since the plurality of dust collecting portions 23 are formed in the light path portion 22, a zone between the light source 21 and the air flow passage 11a has a configuration in which a cross section is repeatedly varied by the light path portion 22 and the dust collecting portions 23. Therefore, even when dust enters the light path portion 22 from the air flow passage 11a, dust is collected in the dust collecting portions 23 to allow no dust flow to the light source 21.

A light extinction portion 24 is formed coaxially with the light path portion 22. The light extinction portion 24 having a space formed therein is formed at a side opposite to the region where the air flow passage 11a is in communication with the light path portion 22. The light extinction portion 24 allows light passed through the air flow passage 11a to become extinct therein. When light which is not scattered by dust is reflected and is incident onto the light receiving sensor 25, an error occurs in the measured value of the light receiving sensor 25. Therefore, the light extinction portion 24 allows light to become extinct therein so that light, which is not scattered by particulate matter and passed through the air flow path 11a, is reflected and is not incident onto the light receiving sensor 25.

Figure 9:
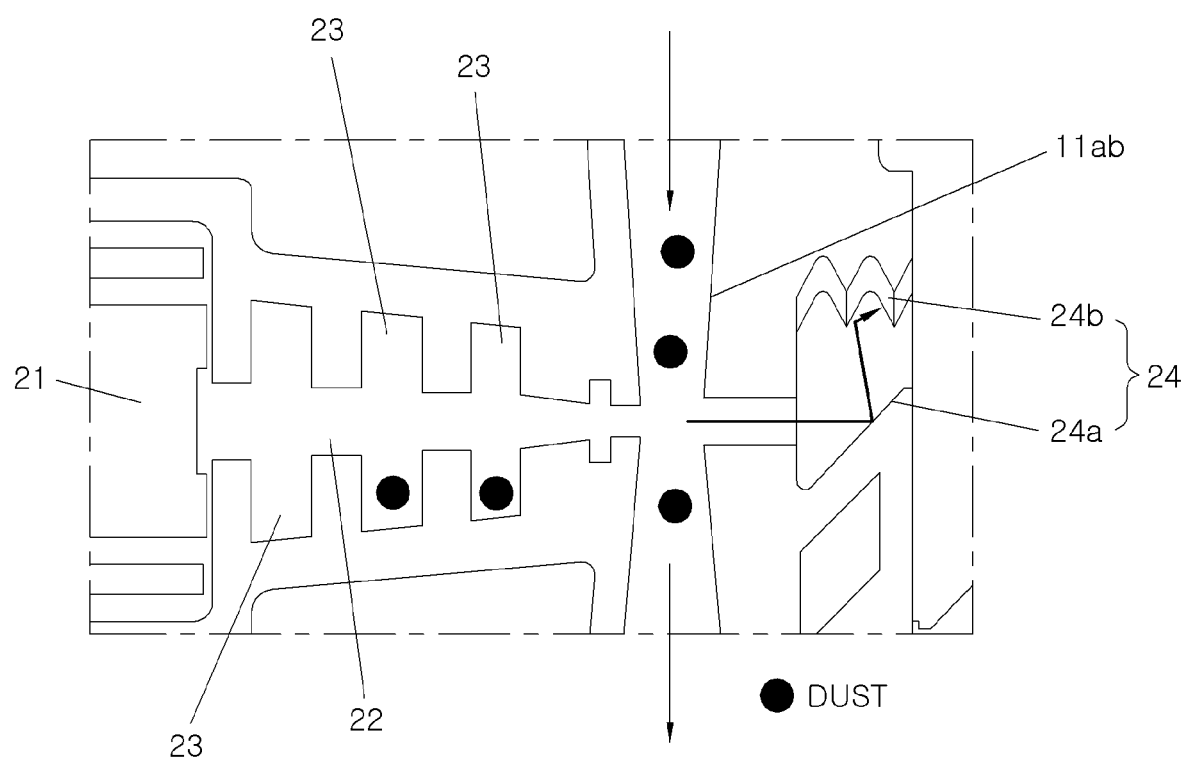
FIG. 9 is a cross-sectional view illustrating, in the particulate matter-sensing sensor assembly according to an exemplary embodiment of the present invention, a process in which dust is collected in a dust collecting portion and a state in which light becomes extinct in a light extinction portion.

Referring to an internal structure of the light extinction portion 24 (see FIG. 9), the light extinction portion 24 includes a reflecting surface 24a configured to reflect light passed through the air flow passage 11a into the light extinction portion 24 and an inclined surface 24b configured to allow light reflected on the reflecting surface 24a to become extinct. The reflecting surface 24a is formed to be inclined with respect to the light path portion 22.

Light passed through the light path portion 22 is reflected on the reflecting surface 24a to allow light emitted from the light source 21 to be reflected to the internal to the light extinction portion 24. The plurality of inclined surfaces 24b are repeatedly formed in the light extinction portion 24. The inclined surface 24b is formed to have a non-high height, and a plurality of inclined surfaces having such structure are repeatedly formed. Since the inclined surfaces 24b which are repeatedly formed are disposed in a form of saw-teeth in cross-section, light which is incident onto the light extinction portion 24 becomes extinct, and thus reflected light is prevented from being incident onto the light receiving sensor 25.

Here, the reflecting surface 24a and the inclined surface 24b are formed not to be smooth like a mirror surface. Since the light extinction portion 24 is the element in which light becomes extinct, the internal of the light extinction portion 24 may not be necessarily formed to be smooth like a mirror surface.

Figure 4:
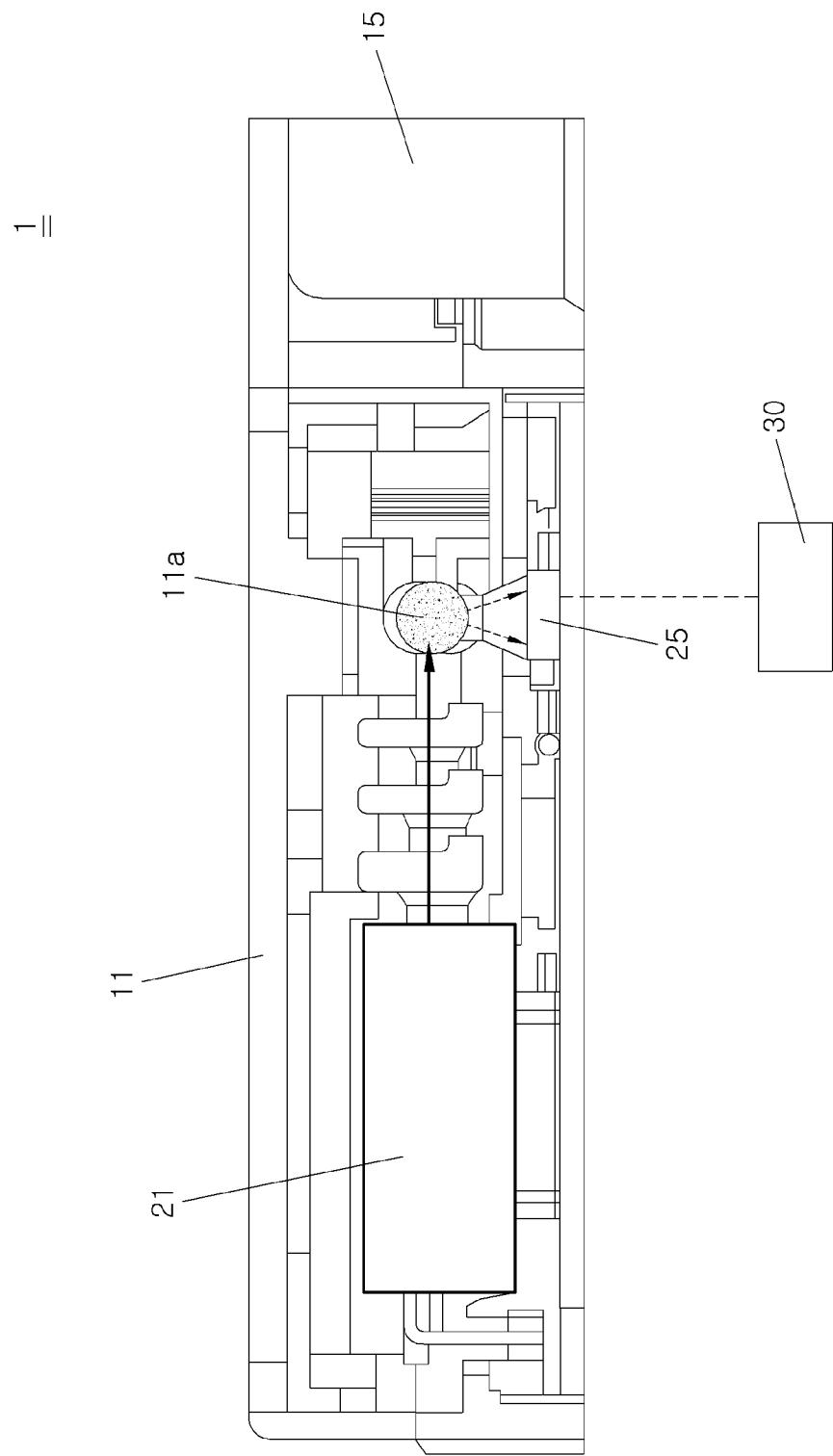
FIG. 4 is a cross-sectional view taken along line II-II in FIG. 3.
Figure 5:
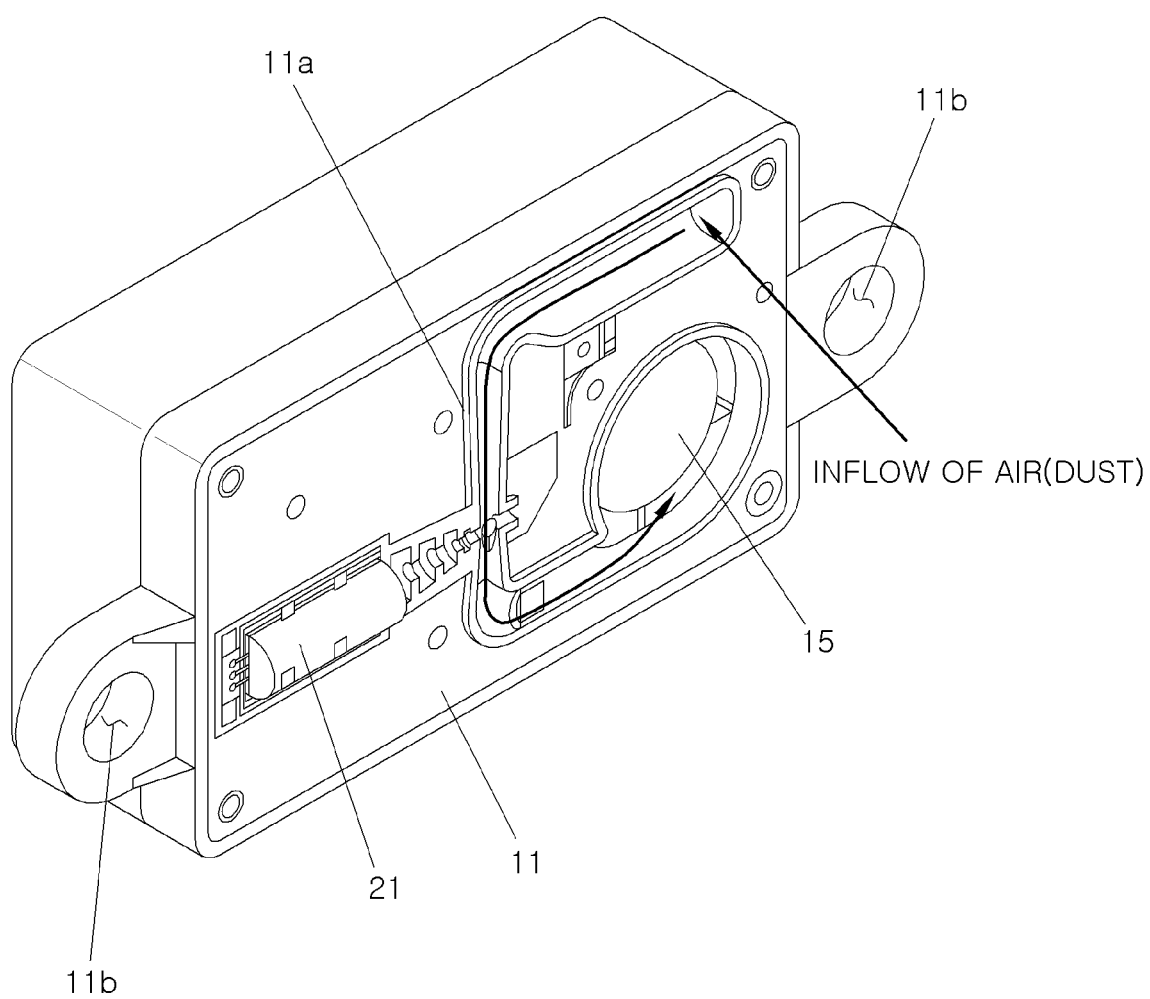
FIG. 5 is a perspective view exemplarily illustrating a path along which air flows into the particulate matter-sensing sensor assembly according to an exemplary embodiment of the present invention.
Figure 6:
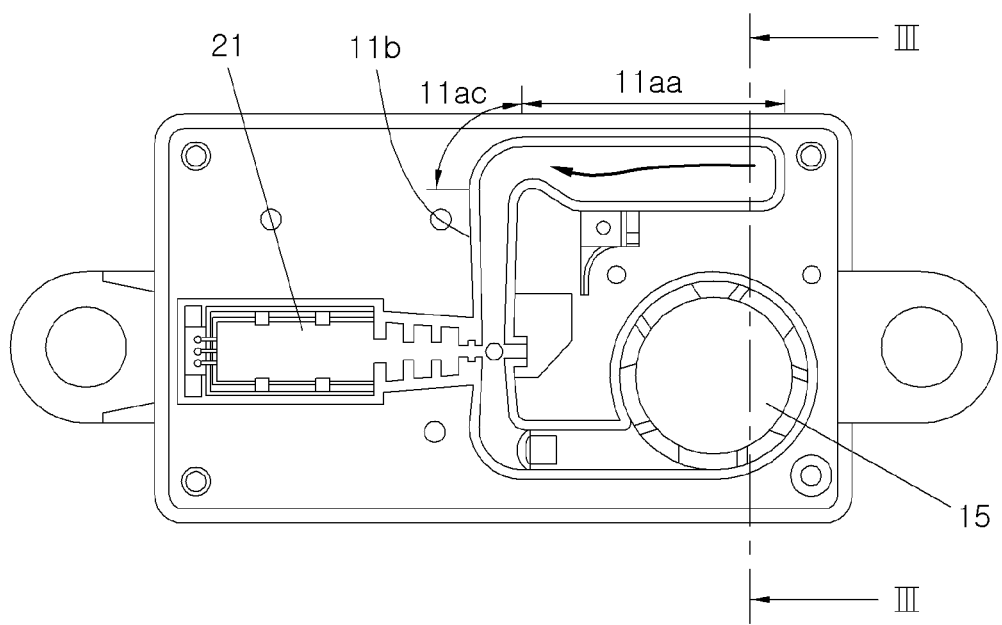
FIG. 6 is a cross-sectional view exemplarily illustrating a state in which air flows into particulate matter-sensing sensor assembly according to an exemplary embodiment of the present invention.
Figure 7:
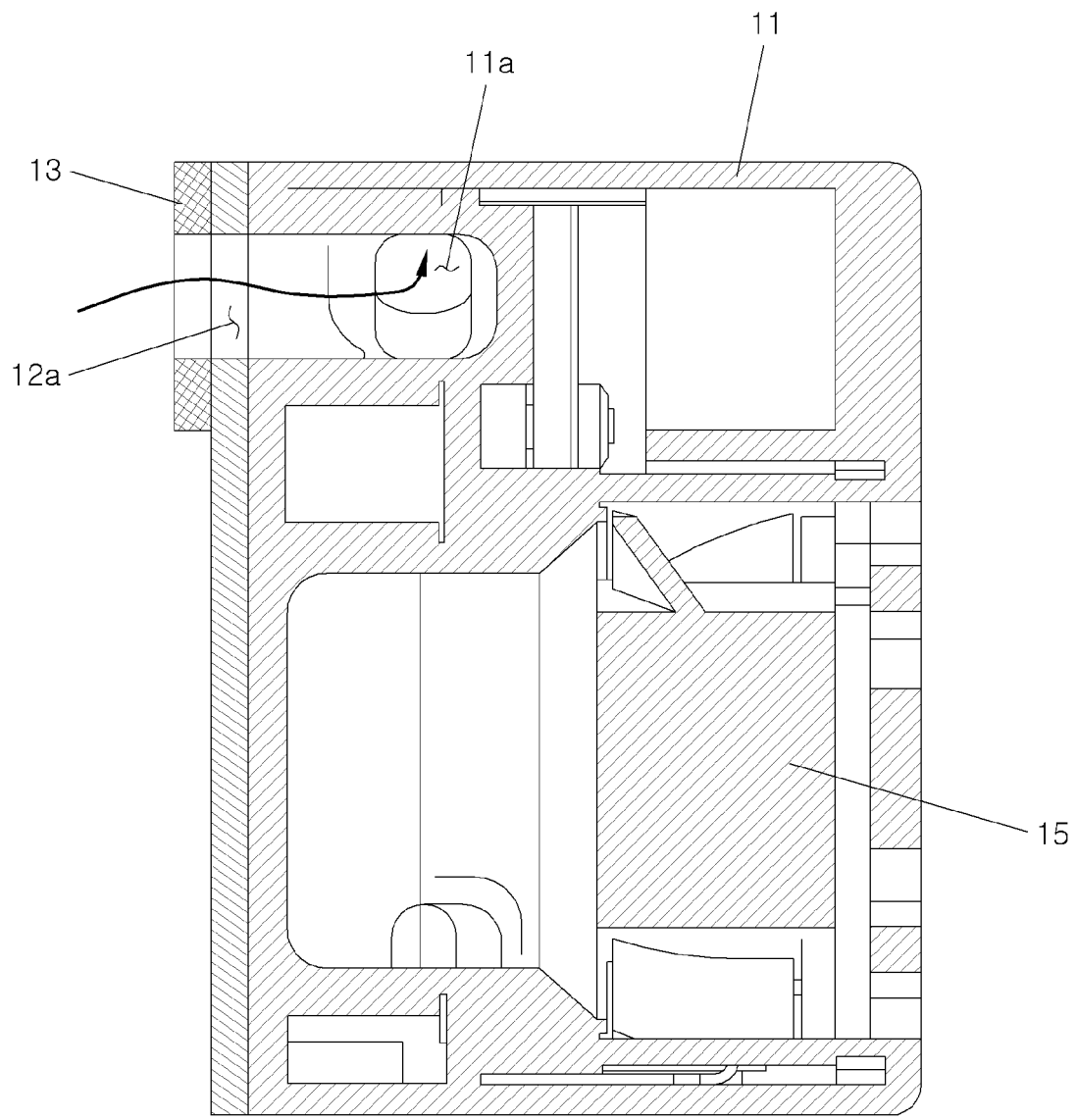
FIG. 7 is a cross-sectional view taken along line III-III in FIG. 6.
Figure 8:
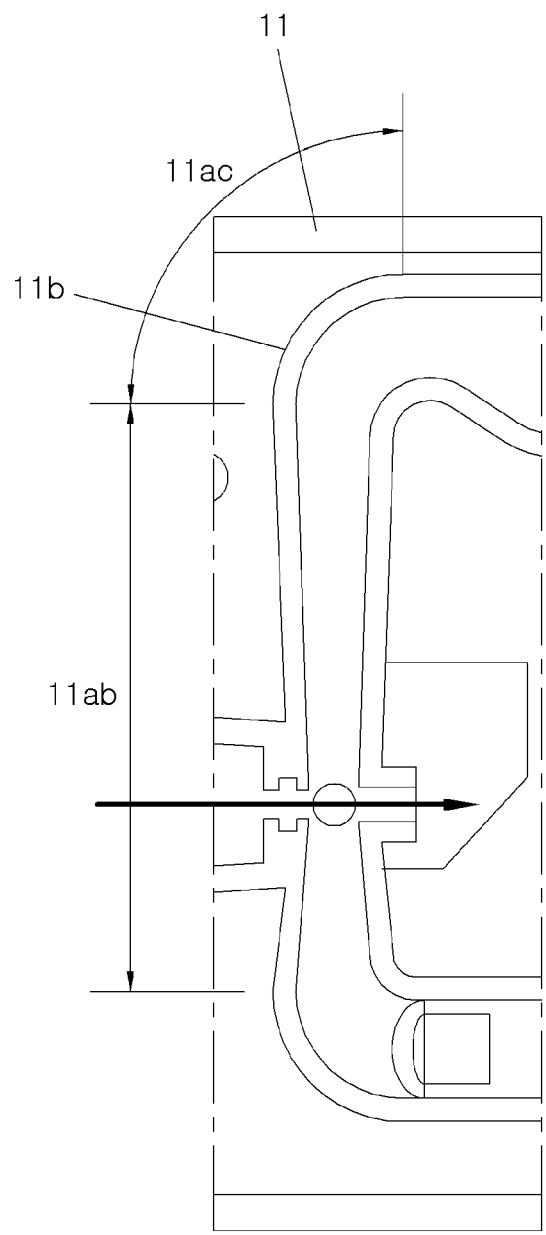
FIG. 8 is a cross-sectional view exemplarily illustrating in detail a region where air flow and infrared rays intersect with each other in the particulate matter-sensing sensor assembly according to an exemplary embodiment of the present invention.

The light receiving sensor 25 is disposed in the housing 11. The light receiving sensor 25 may be a photodiode that outputs an electrical signal when detecting light. The light receiving sensor 25 is disposed a direction perpendicular to the light path portion 22 (see FIG. 4), so that when light which is scattered by particulate matte contained in air flowing into the air flow passage 11a is incident onto the light receiving sensor, the light receiving sensor outputs a signal proportional to scattered light.

The signal outputted from the light receiving sensor 25 is signal-processed in a controller 30 provided in the particulate matter-sensing sensor assembly 1, and the controller is configured to determine concentration ($\mu g/m^3$) of particulate matter contained in air flowing into the air flow passage 11a using the processed signal and outputs the determined value via the connector 17. Meanwhile, although the signal processing and the determination may be performed in the particulate matter-sensing sensor assembly 1 to output concentration of particulate matter from the particulate matter-sensing sensor assembly as described above, the particulate matter-sensing sensor assembly 1 may output the signal of the light receiving sensor 25 as it is, and then the controller 30 in an equipment to which the particulate matter-sensing sensor assembly 1 is mounted may perform a signal-processing and computation to obtain concentration of particulate matter.

Figure 10:
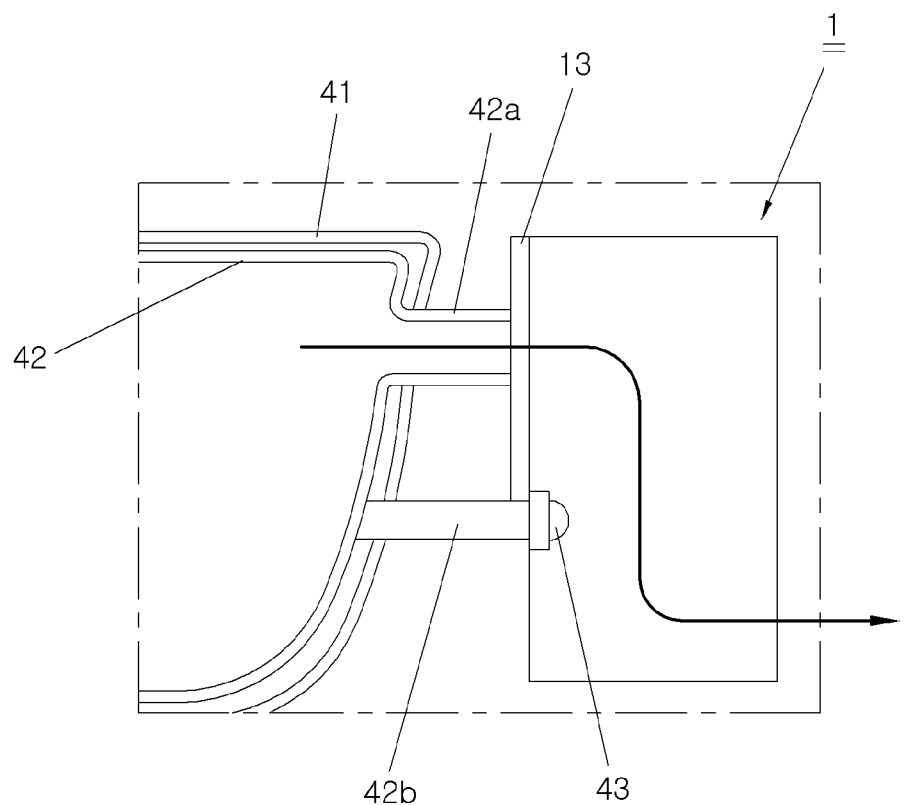
FIG. 10 is a cross-sectional view exemplarily illustrating one example in which the particulate matter-sensing sensor assembly according to an exemplary embodiment of the present invention is disposed on one side of a vehicle.

FIG. 10 illustrates an example in which the particulate matter-sensing sensor assembly 1 according to an exemplary embodiment of the present invention is mounted on a vehicle to detect particulate matter contained in air which is supplied to the internal of the vehicle.

An air vent 42 for supplying air into the vehicle is disposed in a crush pad 41 disposed in front of the internal of the vehicle. By mounting the particulate matter-sensing sensor assembly 1 according to an exemplary embodiment of the present invention on a rear surface of the air vent 42, concentration of particulate matter contained in air supplied to the internal of the vehicle is measured.

An air inlet port 42a through which air enters the particulate matter-sensing sensor assembly 1 is formed in the air vent 42, and the particulate matter-sensing sensor assembly 1 is disposed to allow the air inlet port 42a and the inlet portion 12a to be in communication with each other. At the instant time, the contact pad 13 is located between the air inlet port 42a and the inlet portion 12a, so that air leakage or air inflow through a region where the air inlet port 42a and the inlet portion 12a are connected to each other is prevented.

The particulate matter-sensing sensor assembly 1 is then fastened to the air vent 42 using a fastener, for example a such as fastening bolt 43. After passing through a mounting hole 11b, the fastening bolt 43 is screw-coupled to a mounting portion 42b, and thus the particulate matter-sensing sensor assembly 1 may be fastened to the internal to the air vent 42 in the vehicle.

When the particulate matter-sensing sensor assembly 1 is fastened to the air vent 42 as described, it is possible to measure concentration of particulate matter contained in air supplied to the internal of the vehicle whenever necessary.

When concentration of particulate matter in the internal of the vehicle is higher than a reference value after measuring concentration of particulate matter, external air is prevented from flowing into the vehicle and an air cleaner provided in the internal of the vehicle is operated, and thus it is possible to manage the quality of air in the internal of the vehicle.

According to the particulate matter-sensing sensor assembly of the present invention having the above-described configuration, dust having a relatively large particle diameter among dust flowing into the assembly cannot flow into the internal, reducing contamination of the internal with dust. Due to the optimization of flow of air, a movement of dust flowing together with air onto the light path is blocked as much as possible, and thus a phenomenon in which the light source or the light receiving sensor is contaminated with dust is reduced. Furthermore, even when some of dust is moved toward the light source, by the dust collecting portion, it is possible to prevent the light source from being contaminated.

As described above, since the contamination of the light source and the light receiving sensor is reduced as described above, inconvenience of periodically cleaning the internal to the particulate matter-sensing sensor assembly is eliminated, and thus the time and cost required for cleaning the inside may be reduced.

On the other hand, by allowing light, which is not incident onto the light receiving sensor, among light emitted from the light source, to become extinct, it is possible to enhance the accuracy of the light receiving sensor.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A particulate matter-sensing sensor assembly comprising:
    a housing including an air flow passage through which air flowed thereinto from an outside of the housing flows;
    a fan actuator internally mounted within the housing and configured for flowing the air into the air flow passage from the outside of the housing;
    a light source configured for emitting light to allow the light to intersect with the air flowing into the air flow passage; and
    a light receiving sensor configured to receive light scattered by dust contained in the air passing through the air flow passage,
    wherein the air flow passage is configured such that a region where the air flows thereinto from the outside of the housing has a cross-sectional area greater than a cross-sectional area of a region where the light emitted from the light source intersects with flowing air,
    wherein the housing further includes a light path portion being in communication with the air flow passage to radiate the light, which is emitted from the light source, to the air flow passage, and
    wherein a dust collecting portion is formed on the light path portion to collect the dust in the air introduced into the housing.

2. The particulate matter-sensing sensor assembly of claim 1, wherein the air flow passage includes:
    an inlet portion into which the air flows from the outside of the housing, the inlet portion having a predetermined cross-sectional area over a predetermined length; and
    a detecting portion connected to the inlet portion and having a cross-sectional area smaller than the predetermined cross-sectional area of the inlet portion, and intersecting with the light emitted from the light source.

3. The particulate matter-sensing sensor assembly of claim 2,
    wherein the detecting portion is formed to have a cross-sectional area which is decreased and then increased, in a flow direction of the air.

4. The particulate matter-sensing sensor assembly of claim 2,
    wherein the housing further includes a neck portion connecting the inlet portion and the detecting portion, and
    wherein the neck portion is configured for changing a direction of air flow passed from a width direction of the housing to a height direction of the housing.

5. The particulate matter-sensing sensor assembly of claim 4,
    wherein the neck portion is formed such that as an internal wall of the neck portion approaches an external wall facing the housing, a cross-sectional area of the neck portion is decreased.

6. The particulate matter-sensing sensor assembly of claim 1,
    wherein the air flow passage has a minimum cross-sectional area at a region where the air flow passage is in communication with the light path portion.

7. The particulate matter-sensing sensor assembly of claim 1,
    wherein the dust collecting portion is a space formed in a direction perpendicular to the light path portion.

8. The particulate matter-sensing sensor assembly of claim 7,
    wherein the dust collecting portion is in plural to form a plurality of dust collecting portions, and
    wherein the plurality of dust collecting portions is formed at predetermined intervals along the light path portion.

9. The particulate matter-sensing sensor assembly of claim 8,
    wherein the plurality of dust collecting portions is formed to have different cross-sectional areas.

10. The particulate matter-sensing sensor assembly of claim 9,
    wherein the plurality of dust collecting portions is formed so that a cross-sectional area of each of the plurality of the dust collecting portions becomes smaller as a distance between the light source and each of the plurality of the dust collecting portions is increased.

11. The particulate matter-sensing sensor assembly of claim 1,
    wherein a light extinction portion is formed coaxially with the light path portion to allow light passing through the air flow passage and being incident onto the light extinction portion to be extinct in the light extinction portion.

12. The particulate matter-sensing sensor assembly of claim 11, wherein the light extinction portion includes:
    a reflecting surface configured to reflect light passed through the air flow passage into the light extinction portion; and
    a plurality of inclined surfaces which are formed with intervals so that light reflected on the reflecting surface becomes extinct after the light reflected on the reflecting surface is scattered on the plurality of inclined surfaces.

13. The particulate matter-sensing sensor assembly of claim 1,
    wherein the light receiving sensor is mounted in a direction perpendicular to the light path portion.

14. The particulate matter-sensing sensor assembly of claim 1,
wherein the light source emits a laser beam radiating to the air flowing into the air flow passage.

15. The particulate matter-sensing sensor assembly of claim 1,
wherein the light receiving sensor is a photodiode receiving light scattered by the dust flowing into the air flow passage, and
wherein a controller connected to the light receiving sensor is configured to determine concentration of the dust by processing a signal outputted from the light receiving sensor.

16. The particulate matter-sensing sensor assembly of claim 1,
wherein the housing is provided with a cover configured to enclose an internal of the housing, and
wherein the cover has an inlet formed therein and is in communication with the air flow passage to allow air to flow into the air flow passage from the outside of the housing.

17. The particulate matter-sensing sensor assembly of claim 16,
wherein the cover is provided with an air inlet port formed thereon for flowing air from an air vent, which blows air to an internal of a vehicle, into the housing, and a contact pad configured to seal the housing.

18. The particulate matter-sensing sensor assembly of claim 17,
wherein the housing has a mounting hole formed in a side thereof, and
wherein a fastener is configured to pass through the mounting hole to fasten the housing to the air vent.

19. The particulate matter-sensing sensor assembly of claim 18,
wherein the fastener is a fastening bolt, and
wherein the air vent includes a mounting portion formed thereon to be protruded, and the fastening bolt is coupled to the mounting portion.

* * * * *